(12) United States Patent
Fahey et al.

(10) Patent No.: US 8,271,648 B2
(45) Date of Patent: Sep. 18, 2012

(54) METHOD AND APPARATUS FOR MEDIA DUPLICATION

(75) Inventors: Claudio Robert Fahey, Oak Park, CA (US); Brian Scott Cassell, Canyon Country, CA (US)

(73) Assignee: Cinedigm Digital Cinema Corp., Morristown, NJ (US)

( * ) Notice: Subject to any disclaimer, the term of this patent is extended or adjusted under 35 U.S.C. 154(b) by 746 days.

(21) Appl. No.: 11/696,093

(22) Filed: Apr. 3, 2007

(65) Prior Publication Data

US 2008/0250077 A1 Oct. 9, 2008

(51) Int. Cl.
*G06F 15/173* (2006.01)
(52) U.S. Cl. .................................. 709/225; 709/224
(58) Field of Classification Search .................. 709/203, 709/223–225, 248, 217; 711/162
See application file for complete search history.

(56) References Cited

U.S. PATENT DOCUMENTS

| | | | | |
|---|---|---|---|---|
| 6,246,655 B1 * | 6/2001 | Miller | | 369/84 |
| 6,606,693 B1 * | 8/2003 | Morris | | 711/161 |
| 7,380,078 B2 * | 5/2008 | Ikegaya et al. | | 711/156 |
| 2002/0073175 A1 | 6/2002 | DeKoning et al. | | |
| 2003/0014523 A1 | 1/2003 | Teloh et al. | | |
| 2003/0167287 A1 | 9/2003 | Forster | | |
| 2003/0214744 A1 * | 11/2003 | Ishii et al. | | 360/60 |
| 2004/0047354 A1 | 3/2004 | Slater et al. | | |
| 2004/0243945 A1 * | 12/2004 | Benhase et al. | | 715/853 |
| 2005/0022057 A1 * | 1/2005 | Takamoto et al. | | 714/13 |
| 2005/0028061 A1 * | 2/2005 | Nicolaidis | | 714/736 |
| 2006/0074811 A1 * | 4/2006 | Ferguson et al. | | 705/57 |
| 2006/0248295 A1 * | 11/2006 | Uchiyama et al. | | 711/162 |
| 2008/0059545 A1 * | 3/2008 | Brady et al. | | 707/204 |
| 2008/0104345 A1 * | 5/2008 | Maruyama et al. | | 711/162 |
| 2010/0241898 A1 * | 9/2010 | Yagisawa et al. | | 714/6 |
| 2012/0017058 A1 * | 1/2012 | Maki et al. | | 711/162 |

OTHER PUBLICATIONS

International Search Report for International Application No. PCT/US2008/59284, International Filing Date, Apr. 3, 2008.
European Patent Office, , "Extended European Search Report", Aug. 4, 2011.

* cited by examiner

*Primary Examiner* — Joshua Joo
(74) *Attorney, Agent, or Firm* — Kelley Drye & Warren LLP (57) ABSTRACT

There is disclosed in embodiments herein a digital media content duplication system and method that allows digital media data to be duplicated to one or more destinations and verified. In one embodiment, the system may comprise multiple servers and multiple database structures; providing storage, management. processing, coordination, and tracking of the digital media content and the duplication process.

11 Claims, 7 Drawing Sheets

METHOD AND APPARATUS FOR MEDIA DUPLICATION

BACKGROUND

All references cited in this specification, and their references, are incorporated by reference herein where appropriate for teachings of additional or alternative details, features, and/or technical background.

1. Field of the Invention

The present invention generally relates to the duplication of digital content such as, without limitation, that used for the distribution of digital cinema media content.

2. Description of the Related Art

The presently disclosed embodiments are directed to duplication of media across storage devices as could be used in a number of areas such as, for example, the duplication of computer disk drives.

Until recently, conventional media for the motion picture industry has been 35 mm film. In conventional movie film manufacture, the original color negative film is composed into a color master positive or interpositive print. The master copy is then transferred to a one-light color duplicate negative copy called the internegative, with several internegative copies optionally being created to minimize duplication time. From the internegative stock, many thousands of copies are created on specialized equipment in post-production facilities for worldwide distribution of film copies. For the one hundred thousand plus theater screens worldwide, a post-production process, such as this, is very time consuming and requires a great deal of consumable film stock. In addition, the quality of the recording is degraded with each copy and/or transfer step. Furthermore, repetitive duplication runs of the internegative degrades it's own image quality, therefore, depreciating the image quality of the final release copies ultimately shown to the public.

In the 35 mm world, distribution companies create the requisite number of copies according to the combined orders from all theaters. A two to three thousand foot full length feature film is divided into multiple reel segments prior to shipping to the theaters. A projectionist may inspect the film for damage, splice the segments into one continuous feed, and mount the film for projection onto a single spool. If a film is found damaged beyond repair, the projectionist sources a replacement prior to opening night repeating the inspection and splicing prior to showing.

More recently, digital media has entered the scene of cinematography. Digital media allows producers in the motion picture industry to make use of digital intermediates for the editing of film content and post-production processes as well as permitting the opportunity to convert entirely to an all digital production and/or post-production process. While the editing process has benefited from digital media content, the move to digital theaters and the related digital projection systems has, however, generated it's own set of difficulties. For example, the volume of data involved in a typical digital movie and its need to be transferred and copied with fidelity has created a new obstacle. More so is the obstacle when the digital content includes high image resolution, and color definition of thirty trillion colors or more to provide viewers a positive viewing experience. In some cases, large digital media content data files of four hundred gigabytes or more may constitute a digital movie.

In the digital world, the duplication process at the distributor may involve the creation of a thousand or more hard disk drives, which may take considerably more time than duplicating film. As the number of digital theaters rise and the number of release copies required for these digital theaters increases into the tens of thousands, the cost of post-production duplication and verification of a feature film's digital media content over a reasonable amount of time is escalating and placing additional burdens on the distribution system.

Current digital copy systems allow duplication to a limited number and type of target drives. Duplication of digital media content to thousands of drives using the currently available discrete duplication systems and methods poses several problems. Current systems lack the flexibility and central management, coordination and tracking capabilities necessary for large duplication processing. In addition, duplications derived from current systems may also suffer from less-than-complete digital content verification on every target drive. Therefore, there exists a need to provide improved systems and methods to duplicate, manage and track digital media content to a plurality of target locations.

SUMMARY

There is provided herein exemplary embodiments directed to duplication of media across storage devices as could be used in a number of areas such as, for example, the duplication of computer disk drives.

In one embodiment, there is disclosed a computer system having a first data storage memory storing data content, a first server, and one or more second servers associated with a plurality of storage devices comprising: receiving at the first server a data content duplication request from a remote source; transmitting from the first server a signal to access the data content from the first data storage memory and to cause the accessed first data content from the first data storage memory to be sent to select second servers; transmitting from the first server a signal to cause the one or more second server to write the accessed data content from the data storage memory to one or more of a plurality of storage devices; transmitting from the first server a signal to the one or more second server to verify the first data content matches byte-for-byte data content on each of plurality of storage devices associated with the selected second servers; and receiving at the first server a signal indicating the status of the data content duplication at each of the plurality of storage devices associated with the selected second servers.

In another embodiment, there is disclosed a computer network system having a management server, a content data storage memory storing one or more data content accessible by the network system, and a plurality of slave servers operatively configured to store data content on one or more removable-transportable storage mediums associated therewith, the system further comprising: means for causing the management server to effectuate access to the content data storage memory to retrieve at least one of the one or more data content; means for selectively transmitting the retrieved at least one data content to one or more of the plurality of slave servers; means for instructing the selected slave servers to copy the at least one data content onto the one or more removable transportable storage mediums associated therewith; means for monitoring the progress and fidelity of copying of said data content onto the removable/transportable storage medium associated with the slave servers to which the data content was selectively transmitted; and means for rejecting any removable transportable storage medium associated with the slave servers to which the data content was selectively transmitted when one or more of the removable transportable storage mediums do not contain a fidelity copy of the data content.

In yet another embodiment, there is disclosed a computer network system comprising a content data storage memory, a management server, and a plurality of slave servers, each of the slave servers being operatively configured to copy content from the content data storage memory to one or more removable transportable storage mediums associated therewith upon receipt of instruction from the management server, a computer signal embodied in a transmission medium comprising: a first portion uniquely identifying a particular slave server from other slave servers in the computer network; a second portion identifying a particular content to which the communication is directed; and a third portion indicating the status of the fidelity of copying of the content from the content data storage to the one or more removable transportable storage mediums associated with the particular slave server at a point in time.

BRIEF DESCRIPTIONS OF DRAWINGS

Embodiments of the invention are illustrated in the accompanying drawings in which.

DETAILED DESCRIPTION

There is disclosed in embodiments herein a digital media content duplication system and a method that allows digital media data to be duplicated to one or more destinations. Digital media may include devices such as hard drives, Digital Video Discs, memory cards, file servers, storage area networks and the like. In one embodiment, the system may comprise multiple servers and multiple database structures that may provide storage, management, processing, coordination, and tracking of the digital media content and the duplication process. A management server may be provided to allow the user to manage, including setup, request, initiate, monitor, log, ship, terminate, and track the duplication process and the digital media content via a graphical user interface (GUI). A graphical user interface may be provided for by server operating systems, such as for example, Microsoft Windows Server 2003 and Linux. Such a system can provide for multiple instances of graphical user interface sessions for multiple simultaneous users and/or multiple simultaneous duplication processes of different digital media content to multiple target storage memories, such as hard disk drives. Database structures may be used for the storage of information comprising digital content data, serialized drive inventory data, content booking information and shipping status. Digital media content may be duplicated from one or more drives, which may or may not be the same to one or more similar or dissimilar drives, wherein a master duplicator may be used with an unlimited number of target slave duplicators.

A digital media content duplication system, such as the one disclosed herein, may be operated over a private, public, or publicly-disseminated wide area network, such as for example the internet.

Figure 1:
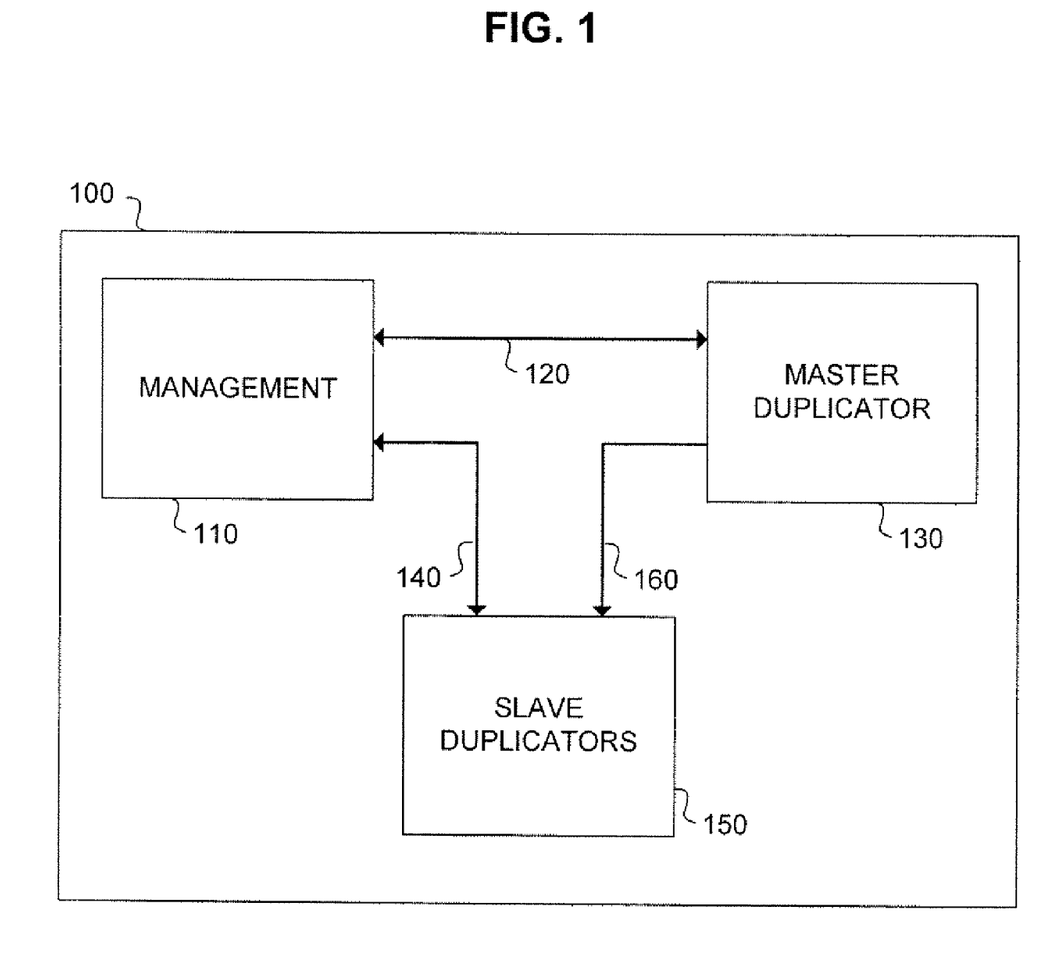
FIG. 1 is a block diagram of an illustrative digital content data duplication network system.

One embodiment of a digital media content duplication system of the present disclosure is depicted in FIG. 1. Digital media content duplication system 100 may be operated by a user from a central control, such as from management subsystem 110, which may be local or remote to the rest of the system. Signals, such as control signals and data signals, may arrive and depart each of the various numbers of sub-systems over a network in the digital media content duplication system. In the embodiment of FIG. 1, control signals 120 and 140 are passed over the network between management system 110 and one or more duplicators, such as for example, master duplicator 130 and slave duplicator 150. The master duplicator may respond to control signals 120 indicating a request to access source digital media content and present it to the network. As a further response to requests, data may be presented as data signal 160 to one or more slave duplicators 150.

Figure 2:
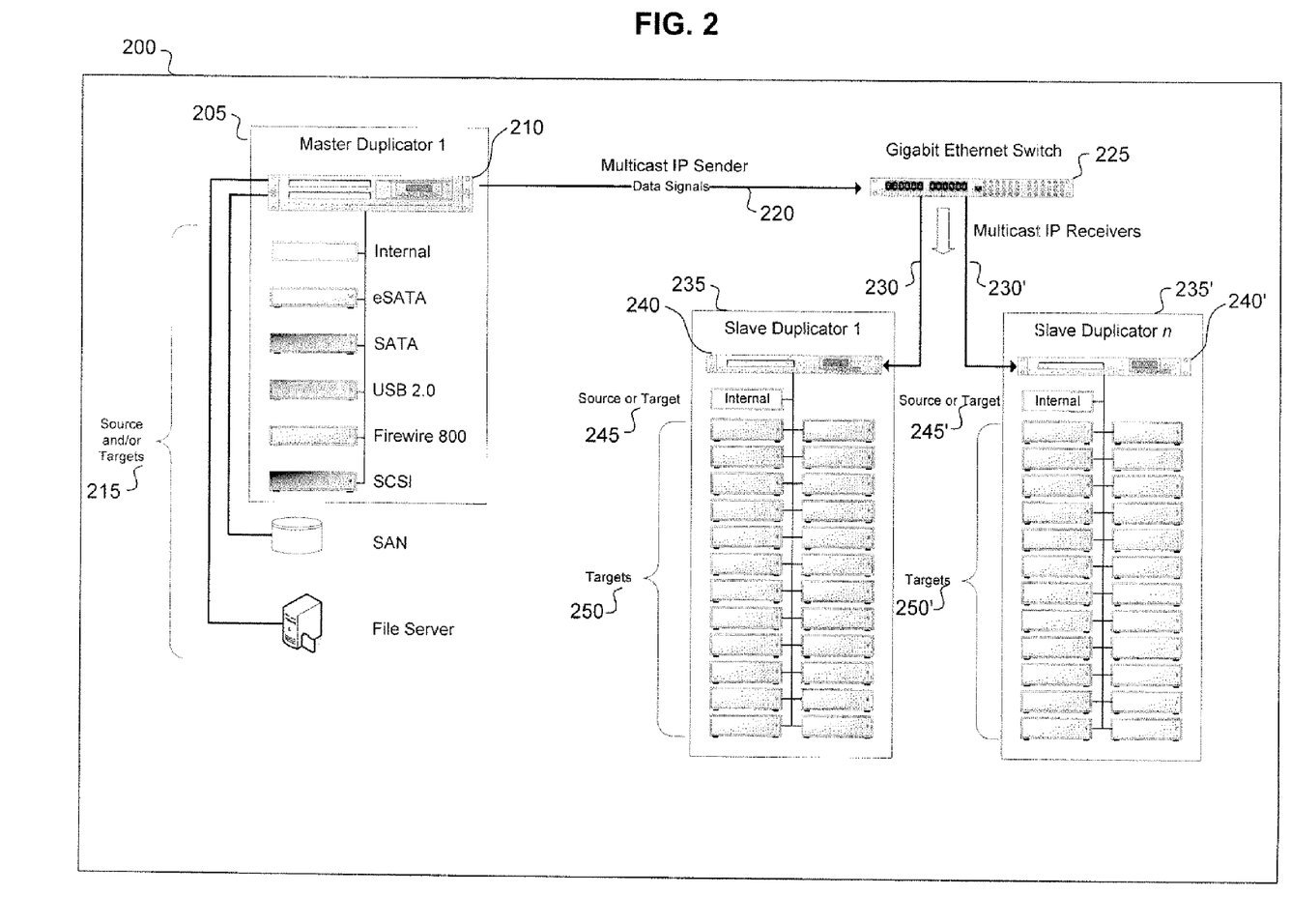
FIG. 2 is a diagram of an illustrative digital content data duplication multicast network system showing movement of digital content data to target drive locations.

FIG. 2 depicts another embodiment of digital media content duplication system 200 with representations of additional components that may be used. In this embodiment, master duplicator 205 comprises server 210 operatively configured to interface with multiple source memories 215 and multiple target storage memories 250, 250', such as may comprise the computer interface protocols eSATA, SATA, USB 2.0, Firewire 800, or SCSI. Server 210 deposed as a master duplicator may also be operatively configured to interface with other storage memories and may comprise an internal hard disk drive; a storage area network (SAN); or a file server.

By possible way of high speed network switch 225 and a multicast IP protocol, signals 220, 230, 230', such as in the form of digital media content, may be passed between master duplicator server 210 and a plurality of slave duplicators 235, 235'. Multicasting is the delivery of information to a group of destinations simultaneously, using the most efficient strategy to deliver the content over each link of the network only once, and only create copies when the links to the destinations split. Signals 230, 230' presented to slave duplicators 235, 235' may be received at servers operatively configured to interface with the switch and several storage memories. One internal storage memory 245, 245', such as for example an internal hard disk drive, may be identified as either a source or target memory. Other target storage memories 250, 250' may be operatively configured to interface with the slave servers and comprise hard disk drives.

Figure 3:
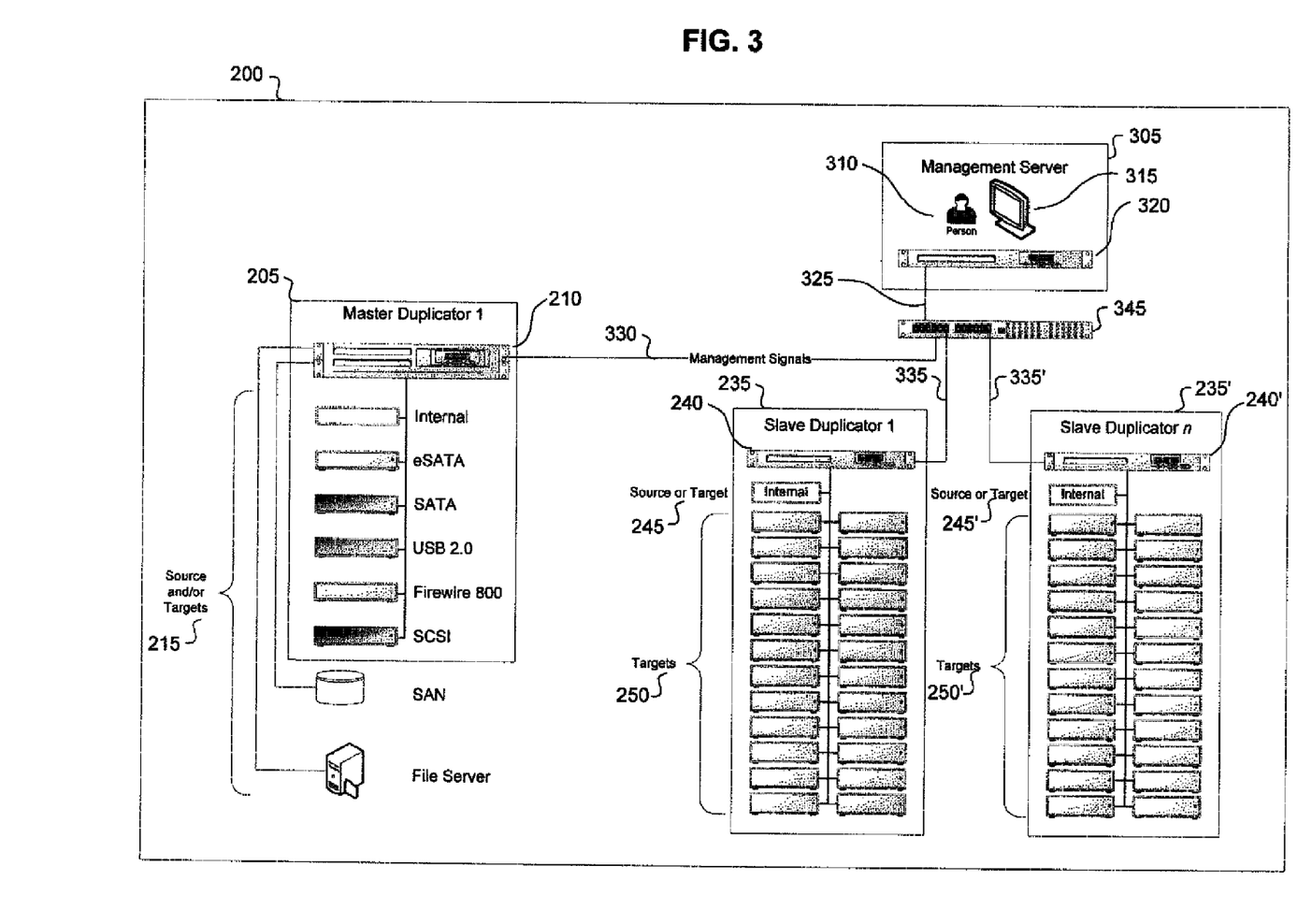
FIG. 3 is a diagram of an illustrative digital content data duplication management network system showing movement of control signals to various components within the network system.

Further to the present embodiment, FIG. 3 illustrates a control signal topology diagram. Digital media content duplication system 200 is operatively configured to be controlled from central location 305, such as by user 310, graphical user interface 315 and management server 320, to which the user can connect locally or remotely. Control signals 325, 330 to and from the management server 320 can be directed via switch 345 to one or more master duplicators 205 and specifically the one or more servers 210 associated with the master duplicator, to manage the digital media content duplication process. The management server 320, as well as the other servers, such as for example, the master duplicator server 210, or slave duplicator servers 240, 240', may also comprise a means for verifying the content duplicated on the plurality of target storage memories 250 meet accepted standards of accuracy as compared to the original source content. The means for verifying the duplicated content may include instructions implemented as an algorithm, executable program or script found in software, firmware, or hardwired into the system, to validate the source and target content on a byte for byte basis. In addition control signals 335, 335' can be directed to a plurality of slave duplicators 235, 235' and more specifically to a plurality of slave servers 240, 240' to manage the digital media content duplication process. Included in the management of the process may be the verification of the data duplicated from the one or more source memories 245, 245' and to the plurality of target storage memories 250, 250'.

Figure 5:
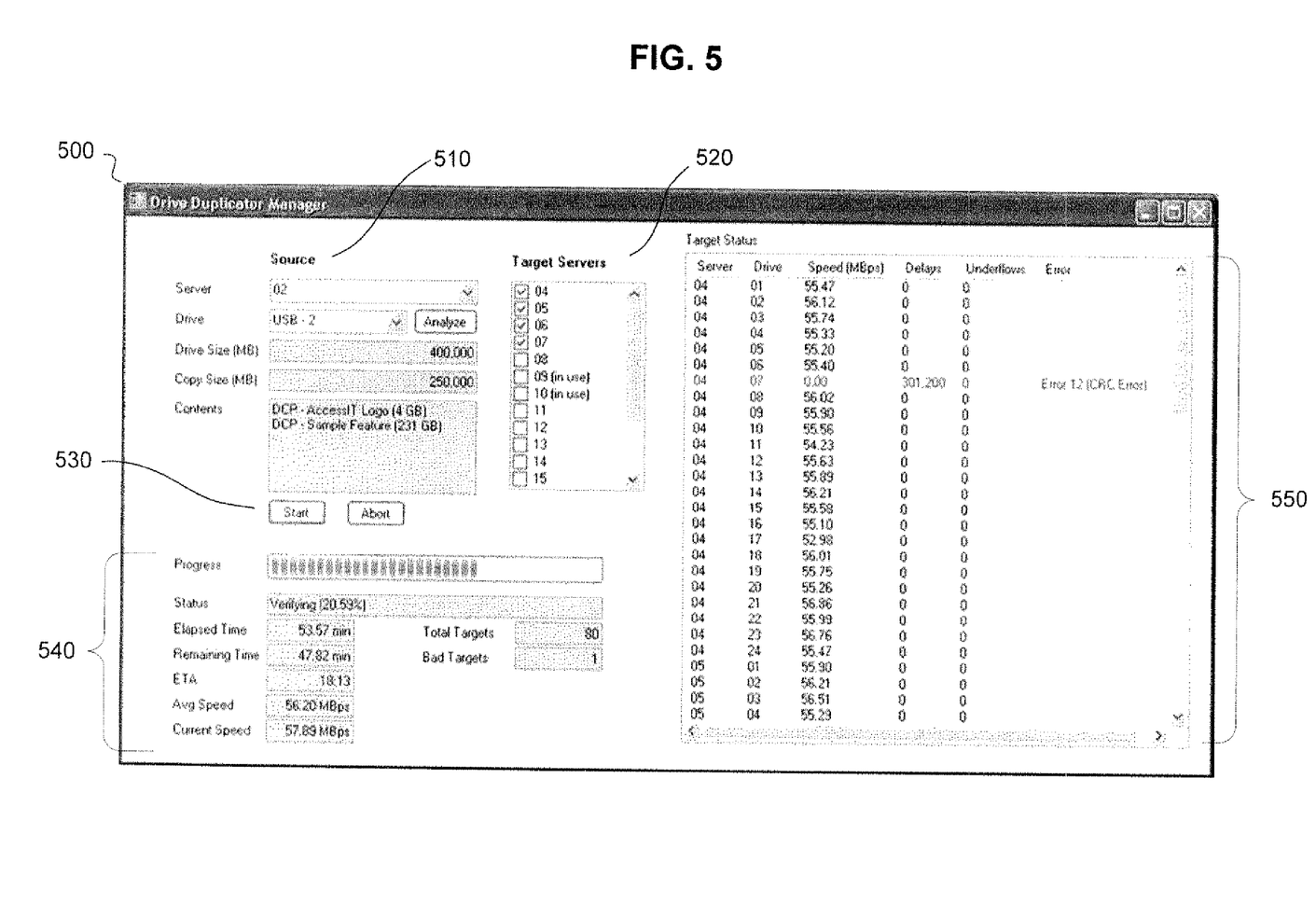
FIG. 5 is an exemplary illustration of the management server graphical user interface.

One embodiment of a possible graphical user interface is depicted in FIG. 5. The graphical user interface 500 may include several areas broken down by function such as source selection, target selection, copy status and target status. In the source selection area 510 the user may identify source memories for digital media content duplication. Selection of the sources shown may include, the Server, the Drive, such as a USB-2, and the contents, determined by an analysis of the source location. Target servers 520, may be selected from a list to facilitate the users interface to the duplication process. Having made appropriate selections the user may indicate by button selection 530 to start or abort the duplication process. As part of the graphical user interface, the user may be provided summary indications 540 of the status of the duplication process or indications of the health of each target drive 550. Summary indications may include graphical depictions, such as a bar graph, to illustrate the copy progress. Whether the progress is in the copy state or verification state and what specific progress has been made may be provided numerically, in addition to the elapsed time, remaining time, ETA, average speed of the copy process, the current speed, how many targets are involved and the number of bad targets. Health indications may include: the server number, drive number, speed, number of delays experienced by the drive and any buffer underflows that may occur, and the error associated with such conditions if any.

Figure 4A:
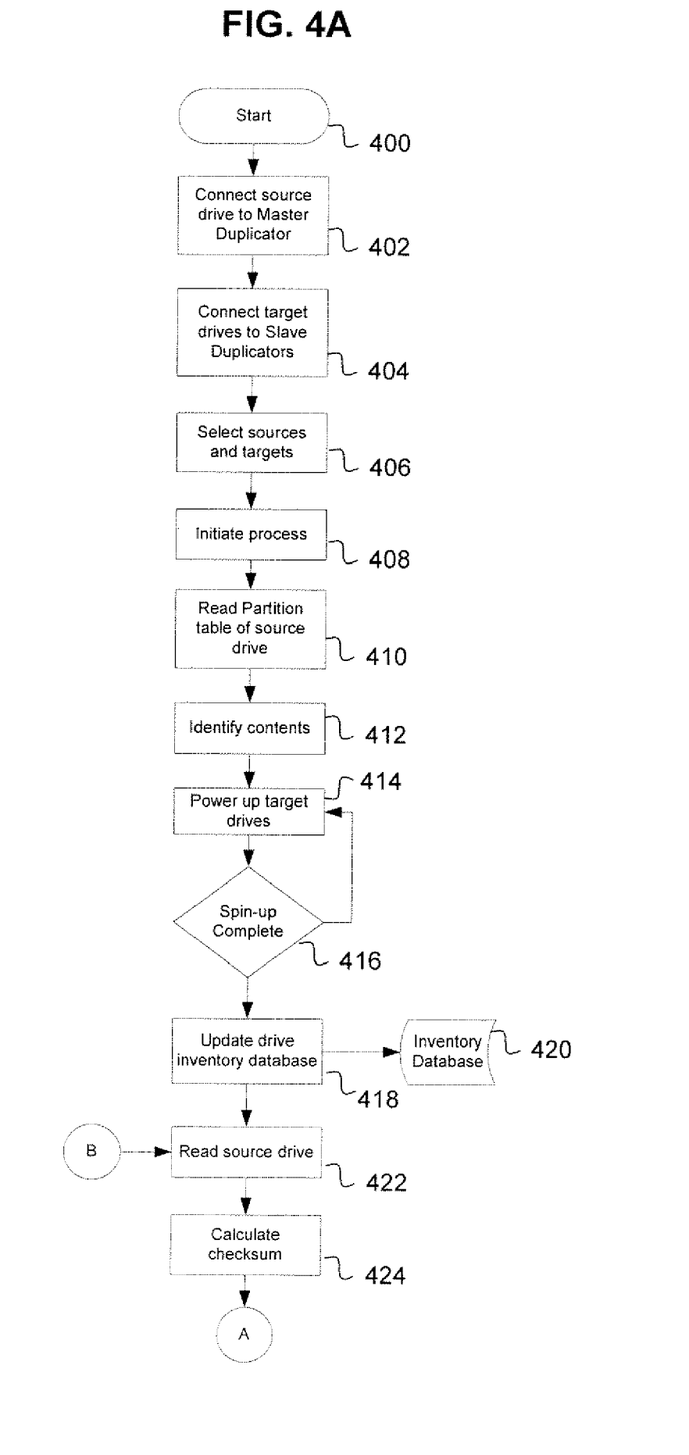
FIG. 4A is a partial flow diagram of illustrative steps for duplicating digital content data.
Figure 4B:
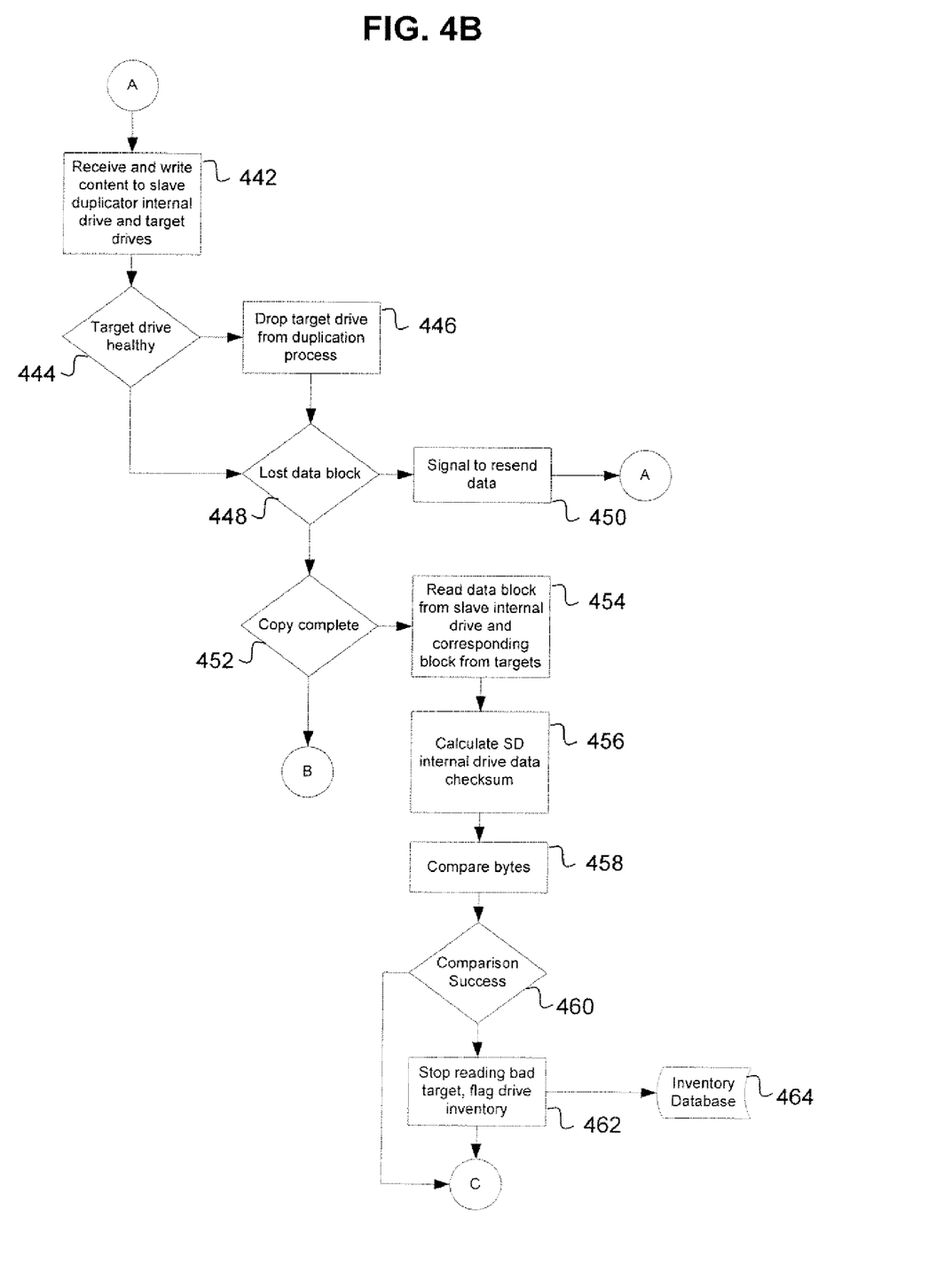
FIG. 4B is a partial flow diagram of illustrative steps for duplicating digital content data.
Figure 4C:
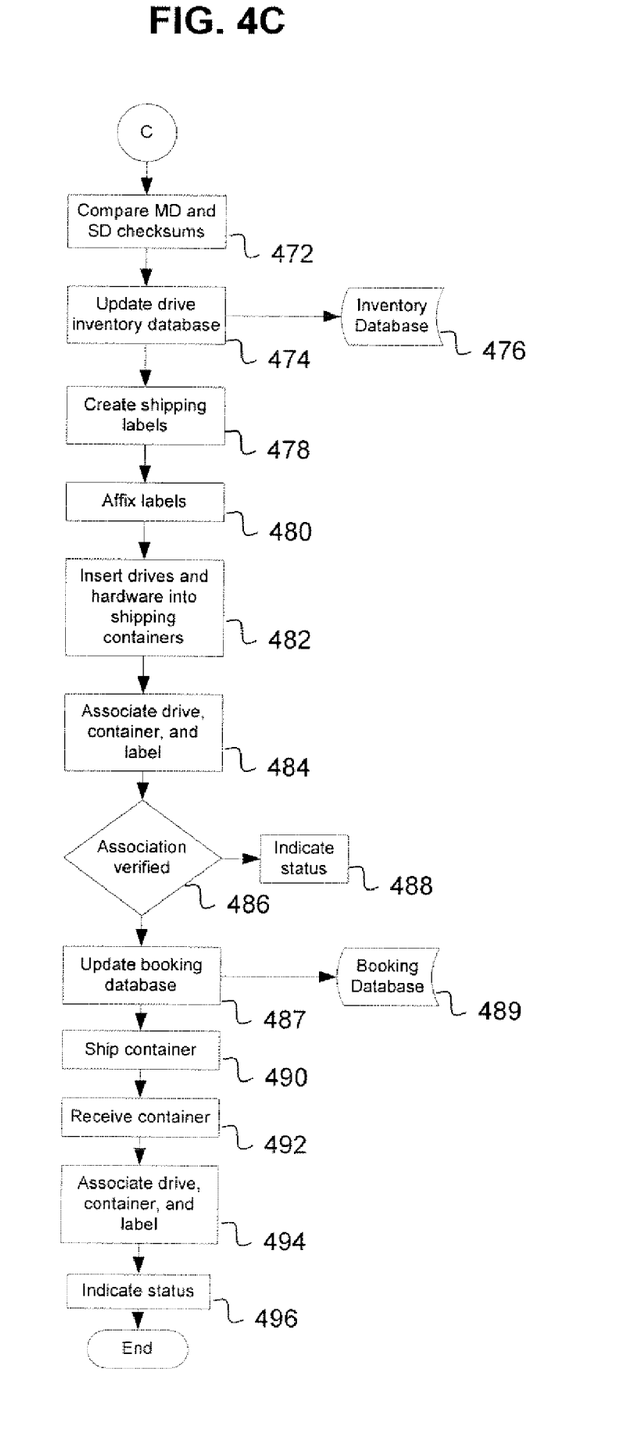
FIG. 4C is a partial flow diagram of illustrative steps for duplicating digital content data.

In one embodiment, as illustrated in the flowcharts of FIGS. 4A, 4B, and 4C, after starting (step 400), the user may connect the source drive (step 402) to the master duplicator. The source drive can be connected via SATA, eSATA, USB, Firewire, FiberChannel, IDE, SCSI, or other drive interface technology. The user then may connect all target drives (step 404) to one or more slave duplicators. When the user completes connection of the target drives, the user may select (step 406) the appropriate master duplicator, source drive, and one or more target drives on one or more slave duplicators via the management server's graphical user interface. The user can initiate (step 408) the duplication process where the management server communicates with the master duplicator and slave duplicators to initiate the duplication process. The master duplicator may read the partition table (step 410) of the source drive to analyze and determine which range of sectors may need to be copied. To save time, unused sectors may not be copied. The master duplicator can identify (step 412) the contents of the source drive. The content description or ID can be determined by analyzing key files on the drive, such as compressed and encrypted packages of all the digital materials necessary for showing. Such packages may be known as Digitial Cinema Packages. In one embodiment, for example, the Digital Cinema Package or 'DCP' can be determined by identifying the list of DCP ID's on the drive, the partition format (i.e. NTFS or ext2), and the drive type based on the drive model number (i.e. USB, Firewire, and/or SATA).

Once the contents of the source drive are determined all slave duplicators can power on (step 414) their target drives and may wait (step 416) for the target drives to spin up. The appropriate slave duplicators may be used to update (step 418) the drive inventory database (420) with the target drive serial numbers, model numbers, and intended content description. In one embodiment, the drive records may then be flagged to represent they are incomplete. The master duplicator may read (step 422) the source drive and send each block of data over an Ethernet network such as a gigabit Ethernet network. The data may be sent using a high-speed IP multicast streaming protocol. The master duplicator may calculate (step 424) an Adler-32 checksum (an integrity measure to detect errors) of all bytes read from the source drive. Each associated slave duplicator listens for multicast data, receives (step 442, FIG. 4B) the data and writes the data to its internal drive and all its target drives. If any target drive (step 444) performs too slowly or generates errors, the slave duplicator may stop (step 446) writing just to that drive. Copying continues to the other target drives. If any blocks of data are lost (step 448) through the multicast network, the master duplicator (step 450-step 442) retransmits the block from a large buffer in RAM or, if necessary, by rereading the block from the source drive. If no blocks are lost the transmission is carried out until the copy process is complete (step 452).

Continuing with the present embodiment, the master duplicator is now idle and can be used for an independent duplication process. Each slave duplicator reads (step 454) blocks of data from its internal drive and all target drives, calculating (step 456) an Adler-32 checksum from the slave duplicator internal drive data. For each target drive, a byte-by-byte comparison (step 458) is made with the internal drive to ensure that the target drive matches the internal drive. This comparison is vectorized, a process by which operations can be performed on a vector of operands to take advantage of advanced CPU operations. Memory access is synchronized in this process to maximize memory cache hits. Any target drives that fail (step 460) the byte-to-byte comparison are indicated (step 462) as bad copies in the inventory database. Likewise if any target drive performs too slowly or generates other errors, the slave duplicator may stop reading just from that drive and consider the drive is a bad copy. Verifying continues with other target drives. Upon completion of the verify pass, the Adler-32 checksum calculated from each slave duplicator's internal drive (step 456) is compared (step 472, FIG. 4C) with the Adler-32 checksum calculated (step 424) from the master duplicator. This ensures that the slave duplicator's internal drive (and thus all target drives), are identical to the source drive on the master duplicator. The drive inventory database (step 476) is updated (step 474) with the target drive serial number, content description, and a status field that represents that success or failure of the duplication process.

Further to the present embodiment, a list of sites (i.e. theaters) to receive identical drives is created manually or automatically. This list is represented in the booking database (not shown). Each site in this list may receive the same digital media content on the same model of hard drive. For each site in the batch, two shipping labels (step 478) are automatically printed. One for the shipment to the site and another for the return shipment. The database will automatically record the shipping label tracking ID and associate it with the site. Each shipping label is affixed (step 480) to a drive shipment container, itself having a unique barcode identifier. The drives and all necessary accessories (i.e. power adapter and cables) are inserted (step 482) into the shipment containers.

Using a portable data terminal (PDT or barcode scanner) with a wireless network connection, the user can scan (step 484) the barcodes on each of the drives, the shipment containers, and the shipping labels to verify their association for shipping. The digital media content duplication system may in real-time determine the site based on the shipping label tracking ID encoded in the barcode, and the model of hard drive based on the hard drive serial number barcode. The digital media content duplication system may also check the booking database to verify that the site is booked for the content and model of hard drive. If the association is incorrect (step 486), the user will be notified (step 488) immediately so that corrective action can be taken. The digital media content duplication system will record (step 487) in the booking database (step 489) that the drive and shipment container are ready to ship to the site. At the appropriate time the containers with the associated drives will ship (step 490) to the designated sites. With integration into the shipping company's tracking system, the status of each drive shipment is maintained automatically until it is delivered to the site (steps not shown).

When drives are returned (step 492) to the duplication center, the user attempts to associate (step 494) the drives, container and label. The user scans the barcodes on the drive, the shipment container, and the shipping label. The inventory and booking databases are updated automatically and according to any errors in the returned shipment. The user may receive (step 496) an indication of the returned shipment status, wherein the user may be given the option or directive to return the drive to inventory for reuse.

With multiple master duplicators and slave duplicators, different drive images can be duplicated simultaneously. The association of master and slave duplicators can be changed easily by the user via the management server and graphical user interface. For each drive record a description of the content and a flag that specifies whether the copy is valid or not may be stored. This inventory database may be maintained automatically by the slave drive duplicators.

In another embodiment, a slave duplicator can be used in a stand alone mode to make additional copies of digital media content from content currently residing on the slave duplicator, such as on the internal drive of the slave duplicator server. After the first batch of drives is created from the source drive on the master duplicator, each slave duplicator having the drive image on it's internal drive, further copies can be created from within this duplicator alone. Additionally, with parameter changes, the slave duplicators can be used in a stand-alone mode to use any drive attached to the slave duplicator (i.e. eSATA or USB) as a source drive.

Statement Regarding Preferred Embodiments

While the invention has been described with respect to the foregoing, those skilled in the art will readily appreciate that various changes and/or modifications can be made to the invention without departing from the spirit or scope of the invention as defined by the appended claims.

What is claimed is:

1. A method comprising:
   receiving and storing by a first server a serialized tracking identity and health for each of a plurality of storage devices associated with each of one or more second servers;
   receiving at said first server, from a remote source, a first data content duplication request comprising the serialized tracking identity for each of a plurality of storage devices associated with a select one or more second servers;
   transmitting from said first server a request to access a first data content stored on a first data storage memory and to cause said accessed first data content to be simultaneously multicast and written to said select one or more second servers and associated said plurality of storage devices according to said serialized tracking identity and first data content, wherein writing of said first data content is terminated to any of said associated plurality of storage devices that generates errors during writing of the first data content;
   transmitting from said first server a request to said select one or more second servers to verify that each byte of the accessed first data content read from the first data storage memory matches byte of the accessed first data content written to all of the plurality of storage devices by way of an integrity measure;
   transmitting from said first server a request to said select one or more second servers to verify said accessed first data content read from the first data storage memory matches byte-for-byte said first data content with said writing a second data content in response to a second data content duplication request;
   indicating, by said first server, rejection of any of associated said plurality of storage devices in an inventory database when an error is generated during writing of the first data content and when any of said associated said plurality of storage devices fails to contain a byte-for-byte copy of said first data content; and
   receiving at said first server a real-time status of the writing of the first data content and health of each of said associated said plurality of storage devices and updating the tracking identity and health of said plurality of storage devices stored at said first server.

2. The method of claim 1, wherein the data content is video content.

3. The method of claim 1, wherein the data content is audio content.

4. The method of claim 1, wherein the data content is video and audio.

5. The method of claim 1, wherein the first server is a master server.

6. The method of claim 1, wherein the plurality of storage devices are hard drives.

7. The method of claim 1, wherein the method further comprises transmitting to said remote source said real-time status of the writing of the first data content and health of each associated plurality of storage devices.

8. The method of claim 1, wherein the method further comprises scanning a barcode for each of said plurality of storage devices having said first data content successfully duplicated thereon and associating said each of said plurality of storage devices with shipping data for delivery to a receiving site.

9. A computer network system comprising:
   means for receiving and storing by a management server a serialized tracking identity and health for each of a plurality of serialized removable-transportable storage mediums operatively associated with one or more slave servers;
   means for causing said management server to effectuate access to a content data storage memory, storing one or more data content accessible by said network system, to retrieve at least one of said one or more data content;
   means for selectively and simultaneously multicasting and writing said retrieved data content to said associated plurality of serialized removable-transportable storage mediums and said one or more slave servers operatively configured to store said retrieved data content on said associated plurality of serialized removable-transportable storage mediums;
   means for monitoring the progress and fidelity during writing and verifying that each byte of the retrieved data content from said data storage memory matches byte of the retrieved data content written to all of said associated plurality of serialized removable-transportable storage mediums to which said at least one of said data content was selectively multicast;

means for terminating the writing of said at least one of said data content to any of said associated plurality of serialized removable-transportable storage mediums that generates errors as a result of said monitoring;

means for indicating rejection of any of said associated plurality of serialized removable-transportable storage mediums in an inventory database when an error is generated during writing and as a result of said any of said associated plurality of serialized removable transportable storage mediums failing to contain a byte-for-byte copy of said retrieved data content; and means for receiving real-time status of writing of said retrieved data content and health for each of said associated said plurality of serialized removable-transportable storage mediums and updating the tracking identity and health of said plurality of serialized removable-transportable storage mediums at said management server.

10. The computer network system of claim 9, wherein the means for monitoring is software based.

11. A computer readable non-transitory storage medium having instructions stored thereon for execution by a processor, said instructions comprising:

a first portion uniquely identifying one or more slave servers, and by a serialized tracking identity and health stored by a master server, a plurality of serialized removable-transportable storage mediums associated with said one or more slave servers, in a computer network system, each of said slave servers being operatively configured and instructed to simultaneously copy data content multicast from a content data storage memory to said plurality of serialized removable-transportable storage mediums based on said serialized tracking identity and health;

a second portion identifying a particular content to copy from said content data storage memory to said one or more plurality of serialized removable-transportable storage mediums simultaneously during other content copying, verifying that each byte of said particular content from said content data storage memory matches byte of said particular content written to all of said plurality of serialized removable-transportable storage mediums, said particular content residing on said content data storage memory;

a third portion indicating a fidelity of copying of said particular content from said content data storage memory to any of said plurality of serialized removable-transportable storage mediums associated with a particular slave server at a point in time and updating the serialized tracking identity and health of any of said plurality of serialized removable-transportable storage mediums stored at said master server;

a fourth portion terminating writing to any of said plurality of serialized removable-transportable storage mediums that generates errors during writing of said particular content;

a fifth portion indicating rejection of any of said removable-transportable storage mediums in an inventory database when an error is generated during writing of said particular content and when any of said plurality of serialized removable-transportable storage mediums fails to contain a byte-for-byte copy of said particular content; and a sixth portion receiving real-time status of writing of said particular content and health for each of said associated said plurality of serialized removable-transportable storage mediums.

* * * * *